(12) United States Patent
Okada et al.

(10) Patent No.: US 7,809,530 B2
(45) Date of Patent: Oct. 5, 2010

(54) CAD DATA GENERATING DEVICE AND GENERATING METHOD

(75) Inventors: Yuuki Okada, Minato-Ku (JP); Koji Kanbe, Minato-Ku (JP); Ryuichi Tachi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 620 days.

(21) Appl. No.: 11/448,910

(22) Filed: Jun. 8, 2006

(65) Prior Publication Data

US 2006/0279572 A1 Dec. 14, 2006

(30) Foreign Application Priority Data

Jun. 10, 2005 (JP) ............................. 2005-170329

(51) Int. Cl.
 *G06F 17/50* (2006.01)
 *G06T 11/00* (2006.01)
(52) U.S. Cl. .......................................... 703/1; 345/467
(58) Field of Classification Search ...................... 703/1, 703/2, 6; 345/629, 630, 467
See application file for complete search history.

(56) References Cited

U.S. PATENT DOCUMENTS 5,768,149 A * 6/1998 Umney et al. .................. 703/1
7,016,747 B1 * 3/2006 Ninomiya ..................... 700/97
7,016,749 B2 * 3/2006 Kuzumaki et al. ............ 700/97
7,065,476 B2 * 6/2006 Dessureault et al. ........... 703/2
2003/0103083 A1 * 6/2003 Denny et al. ................. 345/771

FOREIGN PATENT DOCUMENTS

| JP | 6-309418 | 11/1994 |
| JP | 8-185434 | 7/1996 |
| JP | 8-329131 | 12/1996 |
| JP | 10-187775 | 7/1998 |
| JP | 2000-3379 | 1/2000 |
| JP | 2001-188809 | 7/2001 |
| JP | 2001-256237 | 9/2001 |
| JP | 2001-325304 | 11/2001 |
| JP | 2002-215695 | 8/2002 |
| JP | 2005-157777 | 6/2005 |

* cited by examiner

*Primary Examiner*—Paul L Rodriguez
*Assistant Examiner*—Andre Pierre Louis
(74) *Attorney, Agent, or Firm*—Oblon, Spivak, McClelland, Maier & Neustadt, L.L.P.

(57) ABSTRACT

A CAD data generating device includes a character string information obtaining unit for obtaining character string information from CAD data having character string information, an association information obtaining unit for searching a database to obtain attribute information associated with the character string information as association information, an understanding support data generating unit for generating and outputting understanding support data on the basis of the association information, and an affixing unit for affixing and outputting the understanding support data to the CAD data.

8 Claims, 3 Drawing Sheets

CAD DATA GENERATING DEVICE AND GENERATING METHOD

BACKGROUND OF THE INVENTION

1. Field of the Invention

The present invention relates to a CAD data generating device for associating CAD data with a database that stores attribute information associated with this CAD data to generate understanding support data and affixing this understanding support data to the CAD data, and also relates to a CAD data generating method.

2. Related Art

In general, a piping route for pipes used in thermal, nuclear, hydraulic power plants and manufacturing facilities is determined by drafting a piping plan at the time of plant planning. In recent years, use of a three dimensional arrangement adjustment CAD becomes a mainstream method for implementing this arrangement planning in consideration of data input operation and data management and utilization after the data input.

In the pipe arrangement design with use of the three dimensional arrangement adjustment CAD, piping components are arranged on a three dimensional virtual space, and a piping route is determined, thereby generating arrangement data of the piping components.

On the other hand, as specification data of the piping components, various pieces of attribute information of a piping system are generated in a predetermined format such as a spread sheet other than the CAD data. In this specification data contains information containing a detailed name of the piping system, the maximum use pressure and temperature in the piping system, a wall thickness and a material of the pipe, the contents with regard to welding such as joint faces of butt welding, and the piping components. The operation for generating the specification data is conducted on all the pipes in the plant to thereby construct arrangement data and specification data based on the three dimensional arrangement adjustment CAD.

As a prior art with respect to the use of the piping data based on the three dimensional arrangement adjustment CAD, regarding arrangement of plant equipment with use of the three dimensional CAD system and design production support system for pipes, there is exemplified a design production support system which is particularly suitable for labor-saving in the design production by integrating stages of concept building, basic design, construction, and manufacturing (for example, refer to Japanese Patent Application Laid-open Publication No. HEI 6-309418).

In addition, examples of the prior art includes a change management method for the three dimensional CAD data (for example, refer to Japanese Patent Application Laid-open Publication No. 2002-215695), a drawing generating device based on a product model (for example, refer to Japanese Patent Application Laid-open Publication No. 2000-3379), a CAD data management device (for example, refer to Japanese Patent Application Laid-open Publication No. HEI 10-301972), and a product drawing generating device (for example, refer to Japanese Patent Application Laid-open Publication No. HEI 6-290237).

In the design operation, while the piping design tool is used, a database that stores the arrangement data generated by the three dimensional arrangement adjustment CAD and the specification with respect to the arranged components is used to generate a piping isometric drawing. This piping isometric drawing is a manufacturing drawing with which it is possible to judge a three dimensional shape of a certain part in a certain piping system and is used in a pipe installment construction.

In recent years, the piping isometric drawing is generated by way of a CAD drawing for the purpose of reduction in design and manufacturing time. In the case of the CAD drawing, as the reduction in design time is aimed, only minimum necessary information for the installment construction is contained. Thus, in many cases, the drawing is generated in view of providing information to a minimum degree at which no problem is caused at the time of the installment construction as long as the only minimum necessary information for the installment construction is outputted.

However, even when the minimum necessary information for the pipe installment is sufficient in the case of construction under a relatively loose legal regulatory condition, information contained in the piping isometric drawing with such minimum necessary information for the pipe installment may not be sufficient in the case of pipe manufacture and piping system installment under a severe legal regulatory condition.

In this case, although the piping isometric drawing is taken as an example, the same tendency and problems are generally pointed out in drawings generated by the CAD.

On the other hand, in piping design drawings which were used before a design tool such as the three dimensional arrangement adjustment CAD was commonly used, a wide variety of information is contained for the sake of convenience at the time of installment. The contents include not only information about the mere piping installment but also procurement information on components and materials, safety measure information, and product life cycle information (product related information).

However, while the drawing operation is mechanized and automated by using the design tool such as the CAD for pursuing the time reduction effect, important information including the procurement information on components and materials and the product related information is neglected. It is therefore difficult to contain such information in the drawing in the original design stage. For this reason, in the case where the important information is added, after the drawing is outputted, it is necessary to perform an operation for adding the important information by hand or the like, which leads to extra operation time and labor therefor.

Furthermore, in recent years, various engineering tools are used in the respective design departments, thereby decreasing the use frequency of a uniform management tool with high versatility which can be dealt with across a plurality of departments. Under the circumstances of the decreased use frequency of the uniform management tool, coincidence of various kinds of data among dedicated engineering tools is now being difficult to achieve.

Meanwhile, data management of linking a range of data respectively generated by various engineering tools, i.e. dedicated tools, in an independent format and drawing generation while reflecting the different pieces of data are still demanded from the viewpoint of efficient and panoptic designing. Therefore, a tool playing a role of so-called linking by associating a variety of data created by the respective dedicated engineering tools (bridge tool) with each other is required. To be specific, it is necessary to use a device for generating a medium which is a drawing by combining various pieces of data.

However, none of the above-mentioned prior arts provides such a panoptic design tool and design method.

SUMMARY OF THE INVENTION

The present invention has been made in consideration of the above circumstances encountered in the prior art and an object of the present invention is to provide a CAD data generating device for associating CAD data with a database that stores attribute information associated with the CAD data to understanding support data and affixing the understanding support data to a CAD data drawing, and also to provide a CAD data generating method.

The above and other objects can be achieved according to the present invention by providing, in one aspect, a CAD data generating device, comprising:

a character string information obtaining unit for obtaining character string information from CAD data having character string information;

an association information obtaining unit for searching a database to obtain attribute information associated with the character string information as association information;

an understanding support data generating unit for generating and outputting understanding support data on the basis of the association information; and an affixing unit for affixing and outputting the understanding support data to the CAD data.

In a preferred embodiment of this aspect, the character string information obtaining unit, the association information obtaining unit, the understanding support data generating unit and the affixing unit may be displayed on a user interface of a client computer to be operable, and the client computer and the database provided externally to the client computer are connected to each other via a network.

It is desirable that the database includes at least one of arrangement data of piping components generated by a three dimensional arrangement adjustment CAD, specification data of the piping components, and a list format file of a calculation result regarding a pipe weight and a surface area calculated on the basis of the arrangement data and the specification data.

It is desirable that the attribute information associated with the character string information is obtained from the database, and the CAD data is affixed to a drawing frame generated by the understanding support data generating unit with use of the attribute information and is outputted.

It may be desired that the attribute information associated with the character string information is obtained from the database, and connection information of the piping components and a component table are generated by the understanding support data generating unit with use of the attribute information and are outputted in a list format.

It is also desirable that attribute information regarding a component model type, a size and a coordinate is obtained from the database as the attribute information associated with the character string information provided for the CAD data and three dimensional data regarding the CAD data is generated by the understanding support data generating unit with use of the attribute information and is outputted.

It may be also desired that a drawing and specification data which are not converted into an electronic file are converted into an electronic file as the CAD data and the attribute information.

It is also desirable that the character string information obtaining unit obtains the character string information from the CAD data having character string information, the association information obtaining unit searches the database which stores the attribute information associated with the CAD data to obtain the attribute information, the understanding support data generating unit generates and outputs the understanding support data on the basis of the attribute information obtained from the database, and the affixing unit affixes the understanding support data to the CAD data.

In another aspect of the present invention, there is also provided a CAD data generating method, comprising the steps of:

obtaining a character string information from CAD data having the character string information;

searching a database to obtain attribute information associated with the character string information as association information;

generating and outputting understanding support data on the basis of the association information; and affixing and outputting the understanding support data to the CAD data.

According to the CAD data generating device for and the CAD data generating method of the present invention of the characters mentioned above, through the scanning of the character string information on the drawing, the related attribute information can be cited from the database to generate the understanding support data, thereby making it possible to affix the understanding support data to the CAD drawing. Therefore, it is possible to generate the understanding support CAD data in which information necessary to the designing is appropriately contained in accordance with the purpose, objects and the like.

It is further to be noted that the nature and further characteristic features of the present invention will be made more clear from the following descriptions made with reference to the accompanying drawings.

DESCRIPTION OF THE PREFERRED EMBODIMENTS

Preferred embodiments of a CAD data generating device and generating method according to the present invention will be described hereunder with reference to the accompanying drawings.

First Embodiment

Figure 1:
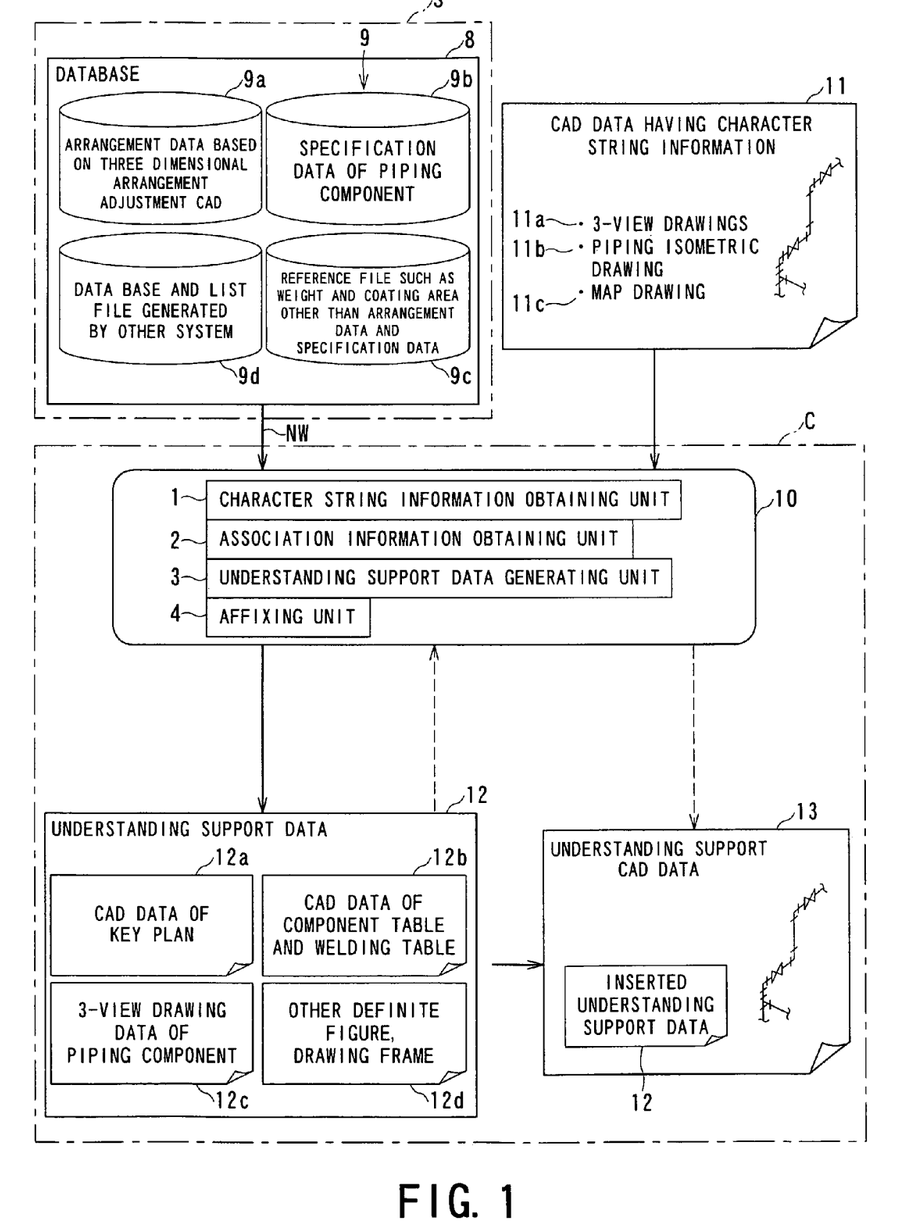
FIG. 1 is a system diagram of a CAD data generating device according to an embodiment of the present invention.

FIG. 1 shows an example showing configuration of a CAD data generating device according to a first embodiment of the present invention. A CAD data generating device 10 includes character string, or merely string, information obtaining means 1, association information obtaining means 2, understanding support data generating means 3, and affixing means 4. The above-mentioned means 1, 2, 3, and 4 are installed in a client computer C to constitute the CAD data generating device 10 and set so as to be displayed on a user interface.

These means 1, 2, 3, and 4 are configured and adapted to be executed when a command is inputted to the user interface.

Meanwhile, in the CAD data generating device 10, a database 8 is stored in an external part of the client computer C, for example, stored in a server computer S. The respective computers C and S are connected to each other via a network NW.

Herein, for example, the database 8 contains data group 9 that is generated at the same time of the design operation. The database 8 refers to a database that stores arrangement data 9a based on the three dimensional arrangement adjustment CAD, specification data 9b of piping components, a reference file 9c, such as a weight and a surface area, other than the arrangement data and the specification data, and a data base and a list file 9d generated by other systems. It should be noted that a format of the data stored in the database 8 may be a data format of the three dimensional arrangement adjustment CAD, a list format, or a spread sheet format.

That is, as the database 8, it is possible to use the arrangement data based on the three dimensional arrangement adjustment CAD 9a, the specification data 9b, the list format file 9d generated by the other systems, and the calculation result list 9c of the weight and the surface area.

In addition, it is possible to use data generated by a design operation conducted in the past as the database 8. In this case, the existing data can be incorporated effectively. For example, the arrangement data and the specification data of the pipes designed in the existing project can be utilized.

The CAD data generating device 10 first scans CAD data 11 having character string information by the character string information obtaining means 1 to obtain the character string information.

Next, the external database 8 is searched for the obtained character string information by the association information obtaining means 2, thereby obtaining attribute information associated with the character string information as association information. Thereafter, the understanding support data generating means 3 generates understanding support data 12 on the basis of the obtained association information. The thus generated understanding support data 12 is affixed to the CAD data 11 having the original character string information by the affixing means 4 to generate understanding support CAD data 13.

The understanding support data 12 refers to the searched attribute information from the data stored in the database 8. From this attribute information, necessary data is obtained, formed into a designated format, and affixed to the CAD data.

Herein, a medium readable and searchable by the character string information obtaining means 1 is the CAD data 11 having the character string information. As a specific example of the readable CAD data 11 having the character string information includes the CAD data 11 having 3-view drawings 11a of the equipment and pipes, a piping isometric drawing 11b, a map drawing 11c, and the like.

On the other hand, a medium searchable by the association information obtaining means 2 is the database 8 having the attribute information associated with the CAD data 11 having the character string information. As a format of the specific database 8, list format data and spread sheet data can be used in addition to the database format.

More specifically, for example, the arrangement data 9a of the piping components generated by the three dimensional arrangement adjustment CAD and the specification data 9b of the piping components, the calculation result list 9c of the weight and the surface area calculated with use of these pieces of data, a database or a list format file generated by a system such as other engineering tool can be used as the database 8.

Each of the data stored in the database 8 is composed of key data and attribute information. The key data herein refers to data functioning as a key for searching of the association information obtaining means 2. For example, each of data of the piping components includes key data (for example, a component name and a piping system name) and attribute information which is individual data of the piping component (for example, a bore, a wall thickness, and the like). The component name and the system name obtained as the character string information are collated with the key data in the database 8, and attribute information of the matching piping component is thus obtained.

Meanwhile, information outputted from the understanding support data generating means 3 refers to the understanding support data 12 generated on the basis of the association information obtained from the database 8. The understanding support data 12 is, for example, a list of a component table or the like associated with components on a drawing, connection information data about the component connection, CAD data 12a of a key plan indicating a position of a component on a drawing in the entire arrangement, CAD data 12b indicating a detailed shape of a component on a drawing, 3-view drawings 12c of a piping component, a drawing frame 12d for placing these pieces of data, or the like.

The design drawing may differ in the drawing frame or the drawing format depending on a use purpose or a delivery destination. The CAD data generating device 10 according to this embodiment also obtains the information on these drawing frame, etc. from the attribute information stored in the database 8 by the understanding support data generating means 3 and places the data in a designated drawing frame and in a drawing format for outputting.

Furthermore, the understanding support data 12 about the targeted piping components is affixed by the affixing means 4 to the original CAD data which has been used for reading out the character string information, and then outputted.

Since the thus obtained understanding support CAD data 13 has one drawing in which plural pieces of useful information are affixed, that is, information useful for designing is placed thereon, it is possible to obtain more easily understandable drawing.

With the above-mentioned means 1, 2, 3, and 4, it is possible to provide a construction such that the character string information is obtained from the CAD data having the character string information, association information associated with the CAD data is obtained by searching the associated and external data base having the information that is associated with the CAD, the understanding support data is generated on the basis of the association information, and the understanding support data is affixed to the original CAD data.

The CAD data generating device 10 can obtain attribute information about the piping components from the database 8 and outputted the CAD data to which the attribute information is attached, in a designated drawing frame format. It should be noted that the attribute information herein refers to all the data except the data functioning as the key data, such as the component name and the system name, among the data unique to the piping components. For example, such attribute data includes information on a position of a piping component, a component direction, a size, and a wall thickness.

For example, the CAD data 11 having the character string information is adapted to contain character string information indicating a component number.

In this case, in the CAD data 11, the component number is the character string information that can be searched for.

Herein, the character string information, that is, the component number is obtained by the character string information obtaining means 1.

Subsequently, the association information obtaining means 2 searches the database 8 for the association information about the character string information to obtain the associated attribute information. The attribute information herein refers to information about a component model type, a bore, and the like. After these pieces of information are obtained, the understanding support data generating means obtains the component model type, bore, and other information associated with the character string information, and the information is converted into data attachable to the CAD data.

When the understanding support data 12 is the list format data of the component model type, bore, and other information, the understanding support data 12 is outputted on the CAD drawing while ruled lines are given to the data, thereby generating the understanding support CAD data 13.

While illustrating a list output method with reference to FIG. 2, a description will be given of a system in which, after the CAD data generating device 10 shown in this embodiment obtains the attribute information from the database 8, a component table and connection information are generated on the basis of the attribute information, and the component table and the connection information are outputted in a list format.

Now, a design for a process piping in a thermal power plant is taken as an example, and the first embodiment of the CAD data generating device according to the present invention will be further specifically described.

In the plant piping design, with the use of the three dimensional arrangement adjustment CAD, the piping components are arranged on a three dimensional virtual space to generate a piping route, thereby generating arrangement data of the piping components. On the other hand, the attribute information of the piping components and the piping system is generated in a spread sheet or the like. As key data for the search, a component name, a system name, and a system number are assigned to each of the arrangement data and the specification data of the piping components. Then, as the attribute information, the specification information about the piping components, such as maximum allowable working pressure and temperature of the piping system, a wall thickness, a material, and joint faces of butt welding, is described. Such a design operation is conducted on all the piping components in the plant.

Furthermore, there is prepared a calculation result list file of the pipe weight and the surface area or the like generated on the basis of the arrangement data and the specification data based on the three dimensional arrangement adjustment CAD that is obtained by the above-mentioned design operation, and the thus prepared list file is then stored in the database 8 as needed.

Meanwhile, in parallel with the above-mentioned design operation, a piping isometric drawing 21 is generated. The piping isometric drawing 21 herein may be data having readable character string information. The piping isometric drawing 21 may be generated by the three dimensional arrangement adjustment CAD or a two dimensional CAD. The character string information such as a component name, a piping system, and measurements is described the piping isometric drawing 21. At this moment, only the necessary minimum information for the installment is described in the piping isometric drawing 21.

By attaching the useful attribute information to the piping isometric drawing 21, the understanding support CAD data is generated.

Figure 2:
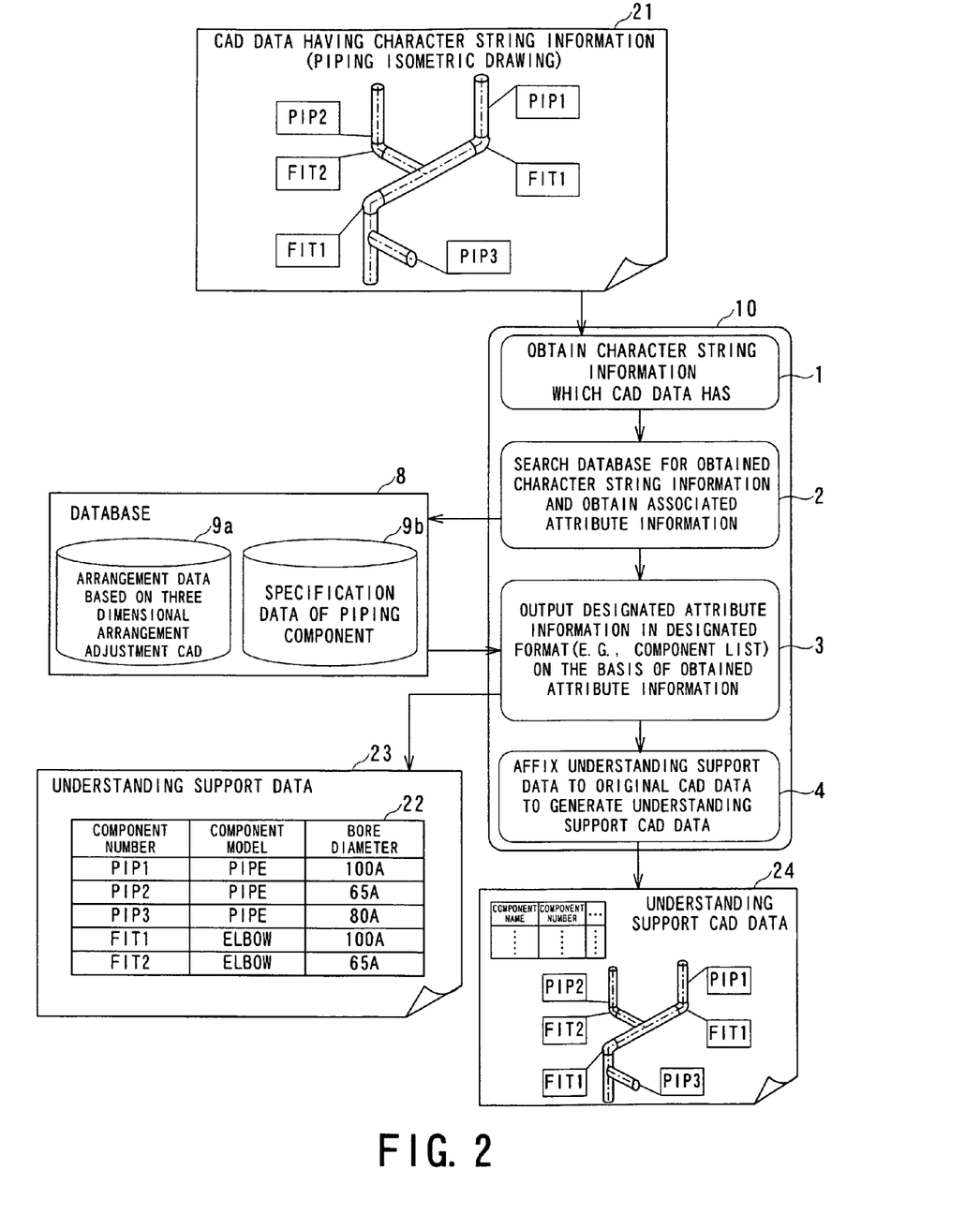
FIG. 2 is a diagram showing a method of generating understanding support data as list information on the basis of the character string information obtained from CAD data having character string information.

As shown in FIG. 2, [Component Numbers] PIP1, PIP2, PIP3, FIT1, and FIT2 are assigned and described in the piping isometric drawing 21. With the use of the piping isometric drawing 21, understanding support CAD data 24 is generated by the CAD data generating device 10.

First, a file of the piping isometric drawing 21 is read by the CAD data generating device 10. At this time, a file of the database 8 is allowed to be referenced to and searched for by the client computer C.

The read file of the piping isometric drawing 21 is searched by the character string information obtaining means 1 from the piping isometric drawing 21 for the character string information. Regarding the information recognized as a character string in this file (the component number), this information is stored in a memory of the client computer C, the search is conducted in the database 8 in the server computer S. If the attribute information (component information) having the matching key data exists in the database 8, the corresponding data is obtained from the arrangement data based on the three dimensional arrangement adjustment CAD and the specification data. In other words, the character string information obtaining means 1 scans the character string information [Component Numbers] PIP1, PIP2, PIP3, FIT1, and FIT2 to obtain the arrangement data and the specification data.

Next, the association information obtaining means 2 searches for the arrangement data 9a of the piping component generated by the three dimensional arrangement adjustment CAD in the database 8 for each of the component numbers. From the searched component information, the attribute information necessary for generating the list of the piping components is extracted and obtained. The attribute information herein is, for example, information about the component model type, the bore, and the like. In the case of the component model type, the information indicates whether the component is a straight pipe or an elbow fitting. In the case of the bore, the information indicates whether the bore size is 100A or 200A (NPS4 or NPS8), and so on.

On the other hand, the search is conducted on the specification data 9b of the piping components in the database 8 to obtain further detailed information. At this time, when the system name obtained during the search through the arrangement data 9a generated by the three dimensional arrangement adjustment CAD is used as the key data for conducting the search on the specification data 9b, for example, it is possible to obtain detailed attribute information of the piping system such as a working fluid in the piping system, fluid conditions including maximum allowable working pressure and temperature, a wall thickness of the component in the piping system, and a component condition for nondestructive testing, etc.

In addition, the calculation result list of the weight and the surface area of the piping components previously prepared with the use of the arrangement data and the specification data based on the three dimensional arrangement adjustment CAD also has the component number as the key data, which is stored in the database 8.

Therefore, the attribute information of the piping system and the piping components are also obtained by the association information obtaining means 2. In this way, each of the data holding the common key data can be used as the database 8. In addition to the above, when the database about the attribute information of the piping components and the list format file are used, it is possible to obtain further detailed attribute information.

As described above, a part or an entity of the attribute information of the piping system and the piping components obtained from the database 8 is arranged by the understanding support data generating means 3 with the component number used as the key data, thereby completing a component table list 22.

In the CAD data generating device 10 of this embodiment, the understanding support data 23 represented by the component table list 22 is attached by the affixing means 4 to the piping isometric drawing 21 which is the original CAD data. That is, the result generated as the component table list 22 (i.e. the understanding support data 23) is rearranged in a list format to which ruled lines are given, to be converted into CAD data and outputted on the isometric drawing 21. In this way, the understanding support data 23 which is the list format CAD data is attached to the isometric drawing 21, thereby completing the understanding support CAD data 24.

As a type of the understanding support data 23, in addition to the above, for example, connection information such as a welding number can be displayed as well. In this case, the welding number is obtained from the piping isometric drawing, and information on the welding number is obtained from the arrangement data and the specification data based on the three dimensional arrangement adjustment CAD, whereby a welding number list can be prepared and displayed.

[Second Embodiment]

The CAD data generating device 10 according to the present invention obtains information about a component model type, a size, an end point coordinate, and face-to-face length from the database 8 as attribute information when the CAD data having the character string information does not refer to data generated by the three dimensional arrangement adjustment CAD. The CAD data generating device 10 then utilizes the information, thereby making it possible to generate and output three dimensional arrangement information based on three dimensional data.

The attribute information including the end point coordinate and the face-to-face length of the piping components is obtained from the database 8 composed of the arrangement data based on the three dimensional arrangement adjustment CAD and the specification data 9b. That is, the CAD data generating device 10 according to this embodiment assumes the case where the arrangement data 9a of the piping components generated by the three dimensional arrangement adjustment CAD exists other than the CAD data 21 having the character string information.

A description will be given of a system of generating the three dimensional data with reference to FIG. 3. Now, designing of a process piping for the thermal power plant is taken as an example, a CAD data generating device 10A according to a second embodiment of the present invention will be described more specifically.

A piping isometric drawing 31 that is CAD data having the character string information contains character string information indicating a component name. In this embodiment, the piping isometric drawing 31 is generated by a two dimensional CAD.

First of all, the character string information 1 is obtained from the piping isometric drawing 31. The CAD data 31 having the character string information is generated by the two dimensional CAD. The character string information herein is [System Number] LINE1. Thus, in this embodiment, as the character string information, [System Number] LINE 1 is obtained by the character string information obtaining means 1.

Subsequently, the association information obtaining means 2 conducts the search on the database 8 to obtain attribute information in association with [System Number] LINE1 by the association information obtaining means 2. As the attribute information at this time, coordinate information and the face-to-face length information of the piping components are obtained from the database 8 (in particular, the arrangement data and the specification data of the piping components based on the three dimensional arrangement adjustment CAD). In addition, information on a component model type, a size and a direction is also obtained.

The coordinate information herein includes representative points such as a center point and end points (connection points) of the piping component. On the basis of the information on these representative points, the component model type, the face-to-face length, and the like, a detailed arrangement and shape of a component can be simulated on the CAD.

That is, the information on the component model type, the size, the end point coordinate, the face-to-face length and the direction with respect to [System Number] LINE1 is obtained by the understanding support data generating means 3 and converted into CAD data, thereby obtaining the understanding support data.

As the understanding support data herein is figure information of a component shape, the data is treated as CAD data at this stage. Therefore, the understanding support data is arranged and outputted in accordance with the coordinate information and the direction obtained from the attribute information, thereby completing understanding support CAD data 32.

For example, with the CAD data generating device 10 according to this embodiment, if the grid axis CAD data generated on the basis of the grid axis information of a building related to the plant arrangement is added to the piping system three-dimensionally generated from the attribute information, it is possible to generate a key plan. The key plan herein refers to information schematically indicate an arrangement of the piping system in the plant.

Figure 3:
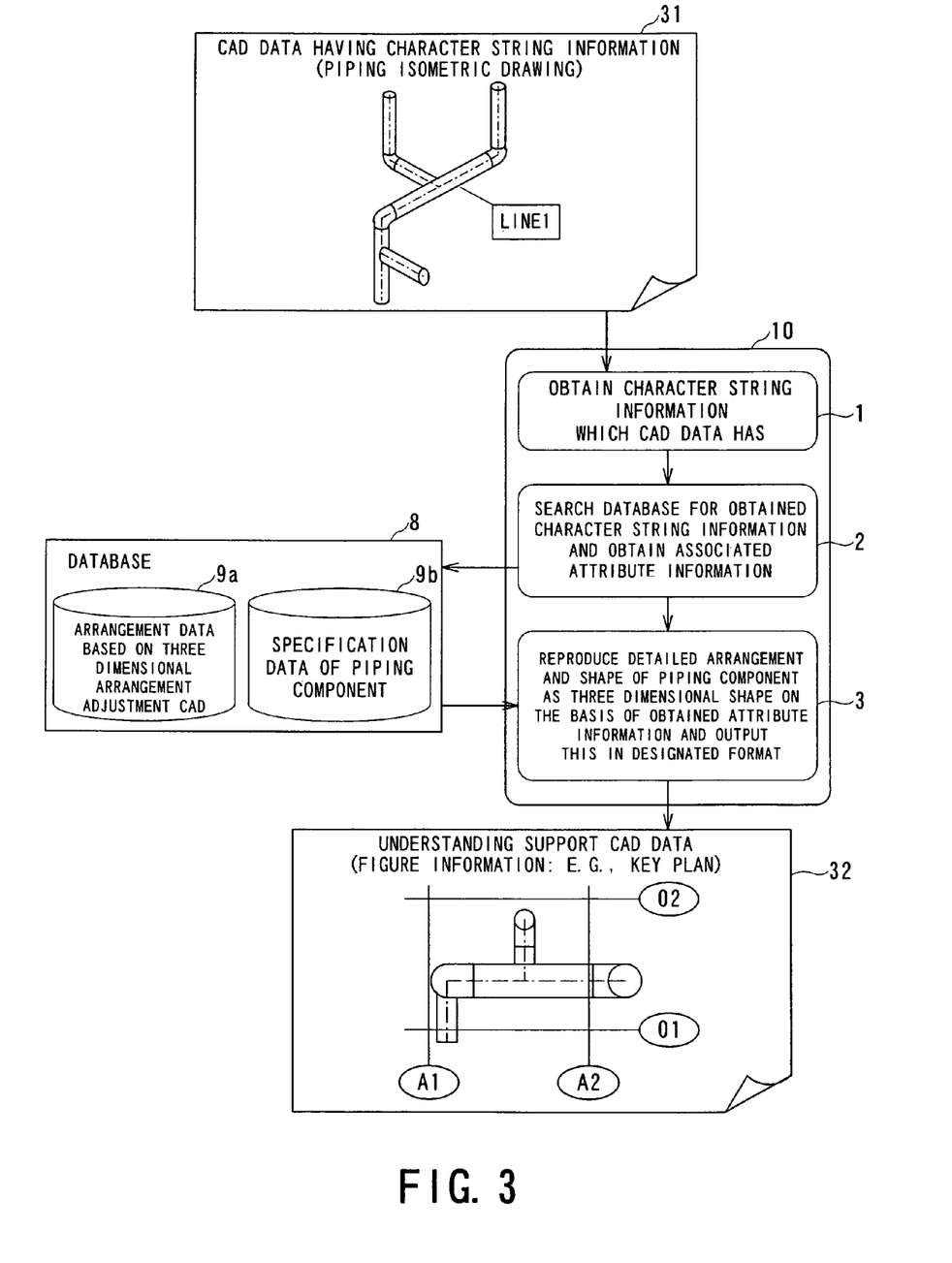
FIG. 3 is a diagram showing a method of generating a three dimensional figure as the understanding support data on the basis of the character string information obtained from CAD data having character string information.

It should be noted that in the CAD data generating device 10 according to this embodiment as illustrated in FIG. 3, the understanding support data itself is generated as the CAD data, and therefore, the understanding support CAD data 32 is obtained from this output. However, it is also possible to affix this CAD data to the original isometric drawing 31. For example, it is possible to mount the key plan on the piping isometric drawing 31.

As described above, when the attribute information for determining the piping component shape is obtained from the database 8, by giving the attribute information to the piping isometric drawing 31, the three dimensional component shape on the CAD can be redrawn. Every piece of the arrangement information of all the piping components related to the target piping system can be obtained from the arrangement data based on the three dimensional arrangement adjustment CAD 9a, and it is therefore possible to generate the CAD data related to the three dimensional shape by unit of the piping system corresponding to a certain isometric drawing 31 as the understanding support CAD data 32. In the understanding support CAD data 32, reference numerals (symbols) A1, A2, 01, and 02 denote columns of a building in which the pipes are accommodated.

It should also be noted that in this embodiment, the arrangement data 8 of the piping components stored in the database 8 for providing the coordinate information and the face-to-face length distance is generated from the arrangement data based on the three dimensional arrangement adjustment CAD 9a. The arrangement data may, however, be generated for the purpose of preparing a drawing other than the arrangement data isometric drawing of the piping components or may be drawing data in a past project.

According to the method of obtaining the attribute information on the coordinate of the piping component from the character string information of the CAD data and generating the three dimensional data of the piping component, it is also possible to generate a detailed manufacture drawing of the piping system. For example, the understanding support CAD data 32 obtained in this embodiment also has the face-to-face length information on components, for instance, pipes. When the information is utilized, a dimension can be expressed by using a dimension line and a witness line and as well. Therefore, on the understanding support CAD data 32, information such a component number, an end point coordinate, and a welding number is displayed by way of a leader line. In this way, with respect to a shape which is difficult to recognize only by using the piping isometric drawing 31, the understanding support CAD data 32 can be generated with use of the understanding support data obtained from the database 8 and utilized to support the user's understanding.

As described above, as illustrated in the respective CAD data generating devices 10 according to the first and second embodiments, the CAD data generating device 10 can obtain necessary information from the attribute information stored in the database to generate the understanding support data, affix this data to the original CAD data and generate the understanding support CAD data that is the CAD drawing on which useful information is described.

It should be noted that in the CAD data generating devices 10 according to the first and second embodiments, an operation of affixing each piece of the understanding support data to the original piping isometric drawing by the affixing means 4 may adopt a method of affixing necessary understanding support data manually, but it is also possible to adopt such an operation that previously designated attribute information is generated in a designated format and this information is automatically attached to the CAD data.

Further, by adding the understanding support CAD data to the thus read piping isometric drawing, information useful for the user can be selected as needed, which can be affixed to the CAD drawing or outputted and provided as a reference document. In other words, the database and the CAD data are linked to each other by the CAD data generating device 10 according to the present invention, whereby it is possible to realize a synthesizing design system where a plurality of engineering tools for constructing each of the attribute information stored in the database are virtually integrated. In this way, with the CAD data generating device according to the present invention, by controlling the output format for the attribute information, various engineering tools which are being derived and developed in each application can be treated as one overall system.

Moreover, the CAD data generating device 10 according to the present invention can be used not only to the operation for generating a drawing for currently developing design, but also to the process for further facilitating the understanding of a drawing in the past design. For example, a manually written drawing in the past design operation is read by a scanner to be stored as an image file, which is converted into CAD data by raster-and-vector conversions. On the other hand, the past manually made list is put in a database/list format file, thereby achieving a database. These databases and the CAD data obtained through the raster-and-vector conversions are associated with each other, thereby obtaining the understanding support CAD data. With the above-mentioned operations, it is possible to rewrite the manually written past drawing or the like into the understanding support CAD data, which is effective in designing a work for a pipe addition construction, a pipe maintenance, and the like.

It should be noted that in the CAD data generating devices 10 according to the first and second embodiments of the present invention, although the piping isometric drawing is represented and described as a medium having character string information, the medium having the character string information targeted by the CAD data generating device according to the present invention is not limited to the piping isometric drawing. In other words, the medium can be applied not only to the CAD drawing about the piping isometric drawing, but also to a mechanical CAD drawing and a map CAD drawing.

Furthermore, the CAD data generating device according to the present invention can be provided in various modes with the CAD data set in a list format, a drawing frame, a figure format, or the like. Moreover, the existing CAD data drawing and the arrangement data and specification data based on the three dimensional arrangement adjustment CAD are utilized, thereby making it possible to reuse information constructed in the past project for a new design.

Therefore, a large number of various data included in drawings in the previous piping designs in the prior art can be incorporated in a drawing. The data output device for linking the data generated by various engineering tools can thus be realized.

In addition, the CAD data generating device according to the present invention can operate in corporation with any type of database as long as the medium can search for the character string information. Thus, the cooperation with a plurality of engineering tools is enabled, whereby it is possible to generate various drawings according to application.

What is claimed is:

1. A CAD data generating device, comprising:
   a character string information obtaining unit configured to obtain character string information from CAD data displayed in an isometric drawing, the isometric drawing having character string information displayed therein as a component number or as a system number;
   an association information obtaining unit configured to search a database to obtain attribute information associated with the character string information as association information;
   an understanding support data generating unit configured to generate understanding support data on the basis of the association information; and
   an affixing unit configured to affix the understanding support data to the CAD data wherein the character string information obtaining unit, the association information obtaining unit, the understanding support data generating unit and the affixing unit are displayed on a user interface of a client computer, and the client computer and the database provided externally to the client computer are connected to each other via a network.

2. The CAD data generating device according to claim 1, wherein the database includes at least one of arrangement data of piping components generated by a three dimensional arrangement adjustment CAD, specification data of the piping components, and a list format file of a calculation result regarding a pipe weight and a surface area calculated on the basis of the arrangement data and the specification data.

3. The CAD data generating device according to claim 1, wherein the attribute information associated with the character string information is obtained from the database, and the CAD data is affixed to a drawing frame generated by the understanding support data generating unit with use of the attribute information and is outputted.

4. The CAD data generating device according to claim 2, wherein the attribute information associated with the character string information is obtained from the database, and connection information of the piping components and a component table are generated by the understanding support data generating unit with use of the attribute information and are outputted in a list format.

5. The CAD data generating device according to claim 1, wherein attribute information regarding a component model type, a size and a coordinate is obtained from the database as the attribute information associated with the character string information provided for the CAD data and three dimensional data regarding the CAD data is generated by the understanding support data generating unit with use of the attribute information and is outputted.

6. The CAD data generating device according to claim 1, wherein a drawing and specification data which are not converted into an electronic file are converted into an electronic file as the CAD data and the attribute information.

7. The CAD data generating device according to claim 1, wherein the character string information obtaining unit obtains the character string information from the CAD data having character string information, the association information obtaining unit searches the database which stores the attribute information associated with the CAD data to obtain the attribute information, the understanding support data generating unit generates and outputs the understanding support data on the basis of the attribute information obtained from the database, and the affixing unit affixes the understanding support data to the CAD data.

8. A CAD data generating method performed using a CAD data generating device, the method comprising:
 obtaining, using the CAD data generating device, a character string information from CAD data displayed in an isometric drawing, the isometric drawing having the character string information displayed therein as a component number or as a system number;
 searching, using the CAD data generating device, a database to obtain attribute information associated with the character string information as association information;
 generating, using the CAD data generating device, understanding support data on the basis of the association information; and
 affixing, using the CAD data generating device, the understanding support data to the CAD data wherein the obtained character string information, the association information, the generated understanding support data and the affixed understanding support data are displayed on a user interface of a client computer, and the client computer and the database provided externally to the client computer connected to each other via a network.

* * * * *